April 27, 1965
M. L. ROBINSON ETAL
3,180,132
METHOD FOR CALIBRATING MICROANALYTICAL
INSTRUMENTS AND APPARATUS THEREFOR
Filed March 12, 1962
2 Sheets-Sheet 2
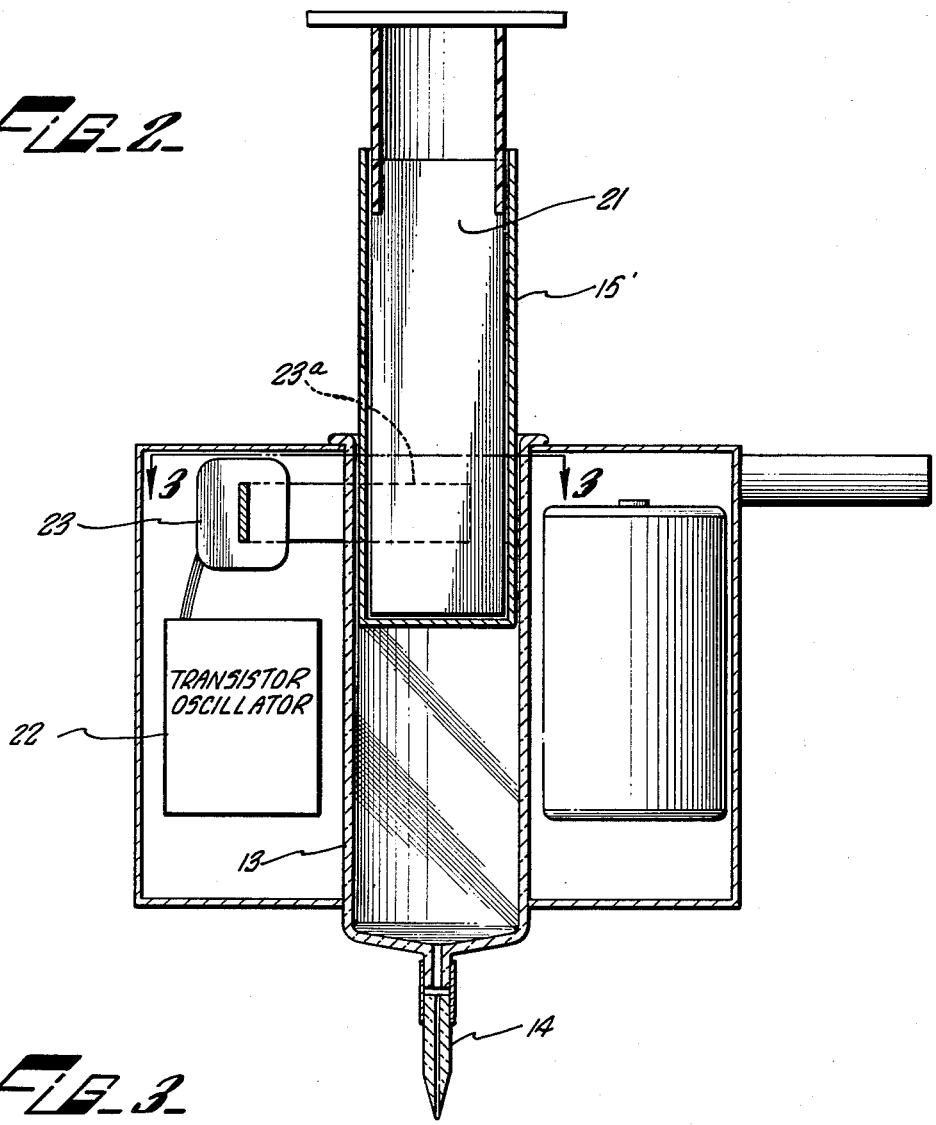
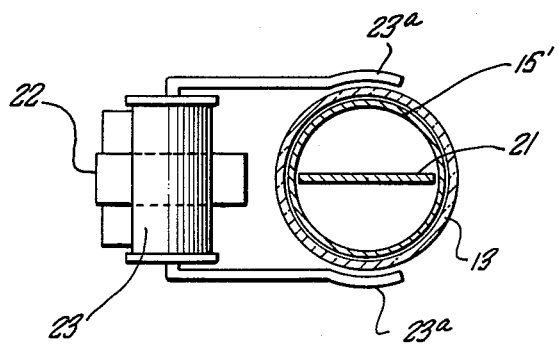
INVENTORS.
MYRON L. ROBINSON
ROBERT R. AUSTIN
BY
ATTORNEYS.

United States Patent Office 3,180,132
Patented Apr. 27, 1965

3,180,132
METHOD FOR CALIBRATING MICROANA-
LYTICAL INSTRUMENTS AND APPARATUS
THEREFOR
Myron L. Robinson, Monterey Park, and Robert R. Austin, Pasadena, Calif., assignors to Barton Instrument Corporation, Monterey Park, Calif., a corporation of California
Filed Mar. 12, 1962, Ser. No. 179,111
7 Claims. (Cl. 73—1)

This invention relates to methods and apparatus for calibrating analytical instruments and more particularly instruments for sensing vapors in the parts per million range.

The method of the present invention is applicable to a vapor sensing instrument of the type disclosed in the copending application of M. L. Robinson entitled "Automatic Titration Apparatus," bearing Serial No. 137,347, filed on September 11, 1961, and copending application entitled "Oxidant Analyzer" bearing Serial No. 179,644, filed March 14, 1962, each assigned to the same assignee as the present application.

Various methods are presently known for calibrating analytical instruments, including methods of calibrating instruments used for the continuous measurement of the concentration of reactive compounds in air or gas streams. In general, these calibrating methods include the steps of introducing a known quantity of a material into the instrument and the output response thereof recorded. The conventional methods, however, are not altogether satisfactory when concentrations of a material on the order of 1 part per million are to be detected by the instrument. When reactive materials are to be detected, some of these prior art methods are impractical. The conventional methods of calibration include metering into a flowing stream the desired quantity of a material to be used for calibrating the instrument. It should be readily recognized that this method is impractical when it is necessary to meter materials in the parts per million range. The conventional tank methods of a preparing a sample result in errors due to absorption on the walls of the tank even though the materials are carefully weighed and measured. In addition, tank methods are impractical for use with reactive materials. Other prior art methods of calibration introduce many errors, such as when multiple dilutions are resorted to, or are tedious and time consuming.

The present invention provides an improved method of calibrating analytical instruments including microanalytical instruments for use with reactive and non-reactive materials through the utilization of apparatus that is portable and convenient to use both in the field or in the laboratory by persons having little or no technical training. Since the method of the invention comprehends only direct weighing and measuring, i.e., volumetric length, it can be characterized as a primary standard. An important feature of the method is that the operation thereof is visible, thereby eliminating erroneous reading difficulties and the accompanying loss of time as a result of the ability to observe the operations. The apparatus utilized for carrying out the method substantially consists of all glass apparatus that not only may be easily cleaned and used for calibrating for radically different materials, but also results in a minimum of contamination.

Broadly, the method of invention comprises introducing a preselected quantity of a gas or vapor to be sensed by the instrument under calibration into the inlet thereof for a predetermined time interval, and recording the output response of the instrument to the preselected quantity of vapor. These steps may then be repeated for different quantities of the same vapor and/or different vapors. The introduction of the preselected quantity of the vapor into the instrument results from carefully measuring the desired quantity of the material to be introduced into the instrument to produce the correct proportion in parts per million, for example, and transferred into a hypodermic type syringe provided with a capillary through which the material is introduced into the instrument. The material is delivered to the instrument at a known rate through the provision of a rotatable plunger for the syringe. The plunger is rotated to create an air bearing between the syringe and the plunger and continuously descends at a known rate into the syringe to continuously expel the material out of the syringe and into the instrument. The time of descent of the plunger in the syringe can be readily determined, and therefore the rate at which the material is introduced into the instrument can be similarly determined. It is an important aspect of the method that the air bearing between the plunger and the syringe be created so as to avoid static friction and to prevent the back leakage of the material between the plunger and the syringe leading to erroneous calibrations.

From an apparatus standpoint, the invention comprehends an improved calibrating apparatus comprising a syringe having a rotatable plunger mounted in the relatively large end thereof and which rotatable plunger may be weighted and defined with fins to receive a stream of air to place the plunger in rotation. In another embodiment of the apparatus the plunger may comprise a magnetic vane that may be magnetically driven for placing the plunger into rotation.

These and other features of the present invention may be more fully appreciated when considered in the light of the following specification and drawings, in which:

FIG. 2 is a cross-sectional view of a modified syringe structure to be used in the arrangement shown in FIG. 1; and FIG. 3 is a cross-sectional view of the apparatus of FIG. 2 taken along lines 3—3.

Figure 1:
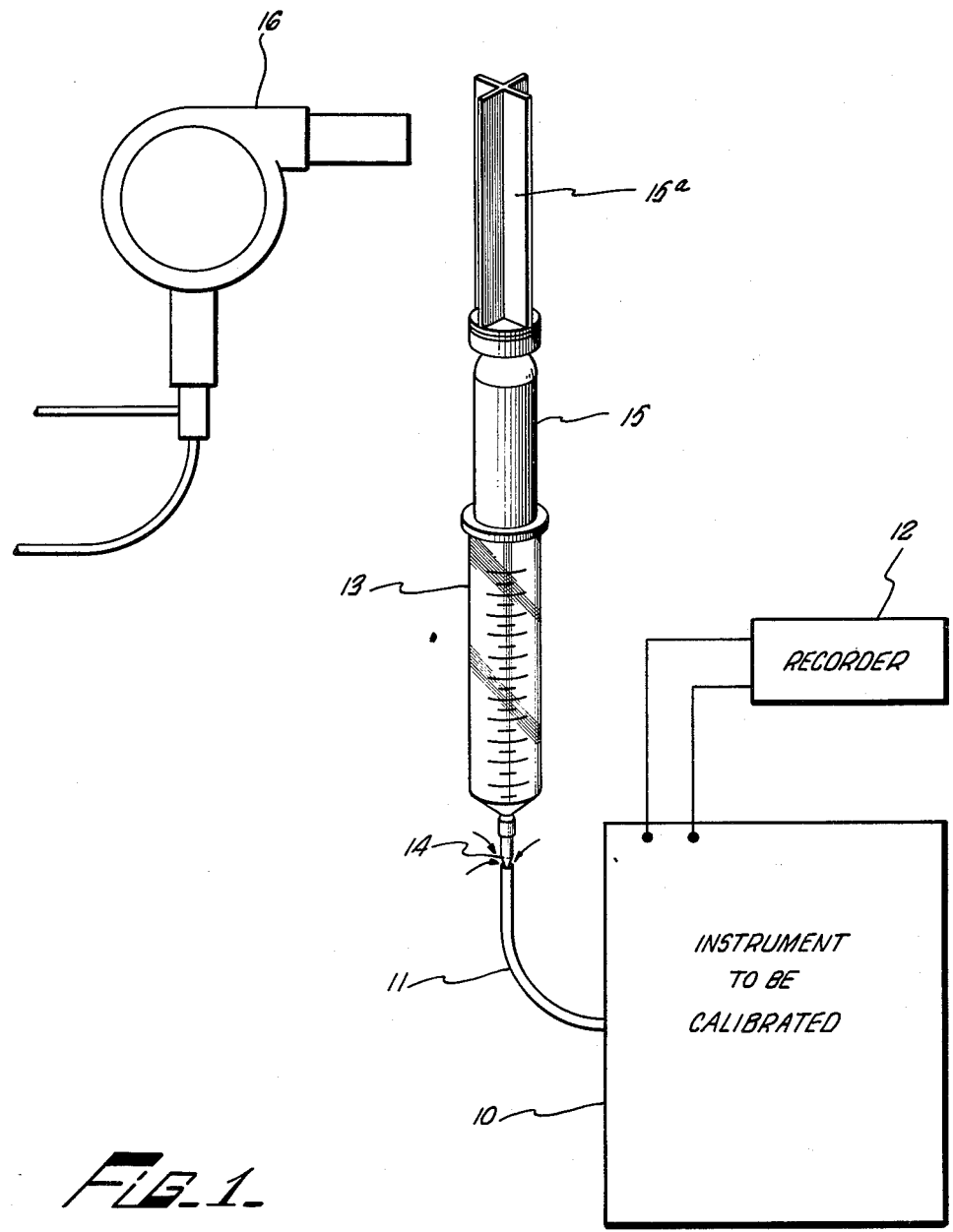
FIG. 1 is a diagrammatic representation of the apparatus arranged with the instrument to be calibrated for carrying out the method of the invention.

The present invention may be used for various types of vapor sensing instruments. In order to simplify the explanation of the invention, it can be considered to be used with the type of vapor sensing instrument disclosed in the above-mentioned copending patent applications. In this type of instrument, in general, the vapor sensed produces an electric current which is indicated on a meter or recorded, and is indicative of the quantity of the sensed vapor. Accordingly, the important features that must be considered in this method of calibration is the quantity of the material that is introduced into the instrument and the time it takes to inject this predetermined quantity into the instrument. These are the only important features in the calibration procedure, and which procedure is applicable to both gases and liquids.

As can be appreciated from FIG. 1, the material to be introduced into the instrument is introduced by means of the inlet tube of the instrument and is introduced in combination with the environmental air thereof. The instrument is shown in block form and identified as the instrument to be calibrated 10, with the inlet tube thereof bearing the reference character 11. The output recorder or output meter is shown likewise as a block 12 connected to the instrument 10.

The apparatus utilized to introduce the material into the instrument 10 comprises a conventional syringe 13, shown as a 100 cubic centimeter syringe in FIG. 1, provided with a capillary 14 at its outlet end positioned in the inlet tube 11. The opposite end of the syringe 13 is mounted with the rotatable plunger 15 provided with a finned end or spinner 15$^a$. The means for rotating the plunger 15 by directing an air stream against the spinner 15$^a$ is shown as a conventional blower 16 mounted adjacent thereto. It should be recognized that with the actuation of the blower 16, the air stream impinges against the spinner 15ª to place the plunger 15 in rotation, and the rotation of the plunger 15 creates a dynamically created air bearing between the inner wall of the syringe 13 and the adjacent wall of the plunger 15. While the plunger 15 is rotating, it is continuously descending into the syringe 13 and thereby expelling the material from the syringe 13 by means of the capillary 14 into the inlet tube 11 to be operated on by the instrument 10. During the interval that the material is being injected into the instrument 10, it may be recorded or observed by means of a meter to determine the response of the instrument to this predetermined quantity. Of course these steps may be repeated for differing quantities of the same material and/or different materials.

The rate of delivery of the material into the instrument 10 may be readily determined by determining the time of descent of the plunger 15 into the syringe 13 by means of a stopwatch. The syringe 13 may be graduated and the apparatus set up so as to rotate the plunger 15 without any material therein and noting the time of descent of the plunger 15. For example, when a 100 cc. syringe is utilized, the time of descent of the plunger from the 80 cc. mark to the 30 cc. mark (50 cc.'s) may be determined, and this time multiplied by two to determine the time of descent for the entire 100 cc.

It should therefore be evident that it is an important feature of this invention that the amount of material introduced into the syringe 13 be carefully prepared and that the delivery rate into the instrument be substantially constant in order to provide a meaningful or error-free output response. We may now consider the procedure for the preparation of the materials that are to be calibrated. A procedure for preparing both gases and liquids will be examined, with the procedure for preparing a reactive gas sample to be first reviewed. The amount of material to be introduced into the syringe 13 can be calculated by known formulas, as will be discussed hereinafter, to produce the required proportion of air material to be sampled by the instrument 10. To this end, it should be noted that the capillary 14 is loosely arranged with the inlet tube 11 to not only allow the material to be deposited therein but also the air to be drawn into the inlet tube 11, as shown. It should be noted that the rate of delivery of the air is not a primary factor in the accuracy of the calibration method, including any small changes therein.

A syringe of suitable size is filled with the fluid to be used in the calibration. It is convenient to measure the concentrated sample in a 10 microliter syringe and to prepare the mixture in the 100 cc. syringe 13. The syringe should be filled from a pressure source to insure elimination of the moisture or other gross contaminations of air from surrounding atmosphere by permitting the gas pressure to drive the syringe plunger. The first filling should be expelled to eliminate traces of air. The plunger is then pushed in to leave the desired amount of gas in the syringe and an adapter attached to the small syringe and the large syringe 13. The large syringe plunger is drawn back to take the sample into the large syringe. The small plunger will be drawn to its bottom position. The syringes are separated and dry nitrogen or dry air is drawn into the large syringe to fill the syringe accurately to the desired dilution, by drawing the plunger 15 of the syringe 13 to the 100 cc. mark, for example. The delivery capillary 14 is connected to the syringe 13. The mixture is agitated by tapping the plunger end with the syringe in vertical position creating vortex mixing.

The syringe 13 containing the mixture is mounted vertically without applying pressure to the side wall and the tip momentarily removed to allow some mixture to escape. Generally it is difficult to maintain good rotation of the plunger with more than 80 percent fill of the syringe.

The plunger is set in rotation at moderate speed; 3 to 20 r.p.s. is recommended. The above procedure is repeated twice to insure equilibration of any adsorbed gas film on the surfaces of the syringe parts. If adsorption is significant, the instrument response will increase until equilibrium is achieved.

The use of dry nitrogen or dry air is recommended because many gases of interest, such as ammonia or nitrogen dioxide, for example, are very reactive with water. Hydrolysis occurs producing non-volatile hydrates. Such compounds can be retained on the walls of the syringe causing low values for calibration data. Such films can also increase the amount of adsorption of samples in later mixtures made in the syringe.

It should be noted here that periodically it is advisable to cap the metering orifice and set the syringe in delivery position with the plunger spinning. The descent, if any, of the plunger is timed and the rate noted. If any back leakage occurs, correction of the delivery data can be made. Should this be more than two percent, it is recommended that the syringe be discarded. It is vital to the effective seal against back leakage that the plunger 15 rotate freely and with minimum clearance.

The procedure for preparing a mixture of vapor in a diluting gas may now be examined.

The pure liquid or a solution of it in a volatile inert solvent is taken up in a microliter syringe or micropipette, as discussed for the preparation of a gas. The calculated quantity is delivered to the top of the large syringe plunger by inserting the pipette or syringe tip in the tip of the large syringe. The large syringe is filled with the diluting gas, nitrogen or dry air, and the vapor mixture made uniform by tapping the end of the plunger, as described above. The delivery procedure described hereinabove for the gases is identical to that for the liquid, and the calibration steps are therefore the same.

It is important to note that should liquid on the plunger bottom reach the wall of the barrel and wet it, capillary action will draw the liquid down the wall from whence it cannot be reliably evaporated into the syringe volume and the run should be discarded, the syringe plunger withdrawn entirely, and surfaces permitted to dry thoroughly before the next mixture is made.

The concentration of the vapor or gas used in calibration is calculated from the data for loading of the syringe delivery time and rate of flow of the instrument into which the sample is delivered.

It should be noted at this point, that it is not necessary to calibrate an instrument at the exact flow at which it is to be operated, providing the rate of delivery of the sample does not affect the efficiency of the instrument or its blank reading. It is only necessary to make up mixtures and syringe delivery rates assuming the desired sampling flow rate of the instrument which will then be calibrated for that flow rate.

Now referring to FIGS. 2 and 3, a modified syringe arrangement for delivering the materials to the instrument 10 will be examined. The syringe 13 proper is essentially the same as that described in connection with FIG. 1; however, the plunger 15 has been modified so that it may be magnetically driven. To this end, the concept utilized in early electric clocks has been advantageously adopted for the syringe-plunger arrangement. An electric clock motor of the type under consideration for the purposes of this invention is described in the text "A Course in Electrical Engineering," volume II, Alternating Currents, published by the McGraw-Hill Book Company, Inc. of New York in 1947, on page 422 thereof. Specifically, the plunger 15' includes a soft iron vane 21 mounted therewith and extending therefrom a predetermined distance so as to be arranged substantially coaxially with the syringe 13 when the plunger 15' is mounted therein. The soft iron vane 21 is induced into oscillations by means of an electromagnetic structure driven by a conventional oscillator 22, which may be a transistor oscillator, for applying the signals of a predetermined frequency to an electromagnet 23. The magnetic portion of the electromagnet 23 is defined with a pair of magnetic pole pieces 23a adapted to surround the outer walls of the syringe 13 to produce an oscillating magnetic field between the pair of arms 23a and thereby act on the soft iron vane 21. A frequency of oscillations for the purposes of this invention may be on the order of 3 to 20 cycles per second. As in the conventional electric clock motors, described in the above-mentioned text, the plunger 15 is set into rotation by manually spinning it and then the electromagnet 23 maintains the plunger 15 in rotation. Of course, the manual starting of the plunger 15 may be eliminated by controlling the oscillator 22 to start at a low frequency and building up to the desired frequency.

It should be noted that in each of the described arrangements for expelling the material from the syringe 13 to the instrument 10, the plunger descends into the syringe solely due to the force of gravity. In addition, the arrangements for rotating the plunger 15 are defined to avoid any axial forces on the plunger to allow the plunger to descend solely due to gravity. Furthermore, the plunger may be oscillated to create the dynamic air bearing and yet provide the desired delivery of the material to the instrument.

Although the invention has been described as a method and apparatus for calibrating a gas or vapor sensing instrument, it should be recognized that the method and apparatus need not necessarily be utilized solely for instrument calibration purposes but can be advantageously employed for metering a desired quantity of a fluid into a fluid stream.

What is claimed is:

1. A method of calibrating a gas or vapor sensing instrument including the steps of accurately measuring a gas or vapor sample into a relatively small syringe, transferring the desired quantity of the sample into a syringe of relatively large diameter with respect to the small syringe, diluting the sample with a predetermined quantity of gas, placing an outlet orifice of a preselected diameter at the outlet end of the syringe, connecting the outlet orifice to the inlet tube of the instrument to deliver the sample into the instrument in combination with the environmental air, closing the other end of the syringe with a rotatable plunger, rotating the plunger to cause it to descend into the syringe and to expel the gas or vapor into the instrument, and recording the output response of the instrument to the quantity of the sample.

2. In a system for calibrating gas or vapor sensing instruments, the combination comprising: an inlet tube for a sensing instrument, a cylindrical container having an end of a relatively large diameter and the other end of relatively small diameter, a capillary having an outlet orifice of preselected diameter connected to the relatively small diameter end of the container, said capillary tube communicating with said inlet tube by means of a non-fluid-tight connection, and a rotatable plunger mounted in the relatively large diameter end of the container.

3. A system for calibrating gas or vapor sensing instruments as defined in claim 2 wherein the syringe is transparent and is calibrated to allow the amount of vapor or gas as well as the position of the plunger therein to be visible and measured.

4. A system as set forth in claim 9, including: mounting a magnetic vane mounted in said plunger, an electrical oscillator providing signals of a preselected frequency, and electromagnetic means connected to be responsive to said signals and applying same across the walls of said container as an oscillating magnetic field to cause the vane and thereby the plunger to rotate.

5. A method of metering fluids into a fluid stream including the step of placing a carefully measured, preselected quantity of a fluid into a cylindrical container, placing a rotatable plunger in one end of the container, and rotating the plunger to create an air bearing between the plunger and the container for causing the plunger to descend into the container at a known rate and thereby expelling the fluid from the container into the fluid stream.

6. A method of calibrating a gas or vapor sensing instrument which produces an output electrical current proportional to the gas or vapor sensed, including the steps of placing a carefully measured, preselected quantity of a gas or vapor to be sensed by the instrument into a syringe, placing a rotatable plunger in one end of the syringe, rotating the plunger to create an air bearing between the plunger and the syringe for causing the plunger to descend into the syringe at a known rate and thereby expelling the gas or vapor from the syringe into the gas or vapor sensing instrument, and recording the output electrical current produced by the introduction of said preselected quantity of gas or vapor.

7. A method of calibrating a gas or vapor sensing instrument which produces an output electrical current proportional to the gas or vapor sensed, including the steps of placing a carefully measured, preselected quantity of a gas or vapor to be sensed by the instrument into a syringe, placing a rotatable plunger in one end of the syringe, rotating the plunger to create an air bearing between the plunger and the syringe for causing the plunger to descend into the syringe and thereby expel the gas or vapor from the syringe into the gas or vapor sensing instrument, recording the output electrical current produced by the introduction of said preselected quantity of gas or vapor, and repeating the above steps for different quantities of the gas or vapor to be sensed by the instrument.

References Cited by the Examiner

UNITED STATES PATENTS

| 1,134,316 | 4/15 | Collette | 73—4 |
| 1,768,386 | 6/30 | Warren | 310—163 |
| 2,981,091 | 4/61 | Roberts | 73—1 |

ISAAC LISANN, *Primary Examiner.*

UNITED STATES PATENT OFFICE
CERTIFICATE OF CORRECTION

Patent No. 3,180,132                      April 27, 1965

Myron L. Robinson et al.

It is hereby certified that error appears in the above numbered patent requiring correction and that the said Letters Patent should read as corrected below.

Column 6, line 8, for the claim reference numeral "9" read -- 2 --; same column 6, line 9, for "in" read -- on --.

Signed and sealed this 16th day of November 1965.

(SEAL)
Attest:

ERNEST W. SWIDER
Attesting Officer

EDWARD J. BRENNER
Commissioner of Patents